United States Patent Office 3,361,641
Patented Jan. 2, 1968

3,361,641
Δ¹-B-NORTESTOLOLACTONE PROCESS
Louis R. Fare, Willingboro, N.J., and Roland W. Kinney, Berwyn, Pa., assignors to Smith Kline & French Laboratories, Philadelphia, Pa., a corporation of Pennsylvania
No Drawing. Filed June 14, 1965, Ser. No. 463,957
6 Claims. (Cl. 195—51)

This invention relates to a unique process for the preparation of the central nervous system depressant Δ¹-B-nortestololactone. In particular, the invention relates to a process for the one-step preparation of Δ¹-B-nortestololactone from various steroid substrates by means of enzymes of the fungi of the genus Pachybasium.

The essence of the present invention is the use of fungi of the genus Pachybasium to achieve the one-step conversion of B-norsteroids to the active Δ¹-B-nortestololactone Pachybasium species have not previously been known to achieve steroid transformations. It is thus quite unexpected to find that enzymes of fungi of the genus Pachybasium are able to simultaneously lactonize the D-ring and dehydrogenate the A-ring.

Steroid substrates suitable for use in the process are B-norprogesterone, B-nortestosterone, and B-norandrost-4-ene-3,17-dione. B-norprogesterone is obtained according to the procedure of Kerwin, U.S. Patent No. 3,072,681. B-nortestosterone and B-norandrost-4-ene-3,17-dione are obtained according to the procedures of Joska, Chem. and Ind., 1958, 1665–6.

Among the Pachybasium species which are preferred for the practice of the process are the species ATCC 16093, 16094, 16095, and 16114.

In order to prepare the Δ¹-B-nortestololactone, the microorganisms are first cultivated in or on a medium favorable to their development.

Liquid media are preferred for submerged fermentations. Such media as malt extract broth, cornsteep liquor, soybean meal broth, peanut meal broth or Czapek-Dox broth have all been found satisfactory. Plain nutrient broth, Trypticase Soy Broth (Baltimore Biological Laboratories) or yeast extract broth are also useful. The media should contain sources of available carbon, nitrogen and minerals.

Carbohydrates, such as starches, dextrins and sugars, including hexoses and pentoses, may be used to furnish the energy and carbon requirements of the microorganisms. However, other sources of carbon may also be used, for example, citric acid and its salts, sodium acetate, or the sodium or potassium salts of other low molecular weight fatty acids or alcohols.

Sources of nitrogen in assimilable form can be made available by soluble or insoluble vegetable or animal proteins or protein derivatives such as cornsteep liquor, soybean meal, peanut meal, casein, meat extracts, peptones and yeast extract. Amino acids, ammonium salts or nitrates can also be used.

Minerals naturally present in the above complex carbon and nitrogen sources are usually sufficient to satisfy the mineral requirements of the microorganisms. If mineral-deficient media are used, any of the commonly used physiological mineral solutions can be used satisfactorily to supplement the chemically defined medium.

A sterile air supply should be maintained during the fermentation. This can be accomplished by exposing a large surface of the growth medium to the atmosphere with constant agitation, or alternatively by the use of submerged aeration devices. Aeration at a rate of about 0.5 to 2.0 volumes of air per volume of growth medium per minute produces satisfactory results.

During the fermentation the temperature should be maintained within a range of about 23° C. to 32° C., preferably from about 25° C. to 30° C.

Optimum growth of the microorganisms and transformation of the steroid substrates are achieved when the pH of the fermentation is maintained within a range of pH 6.0 to 6.8. This may be accomplished by the intermittent addition of mineral acids or bases to adjust the pH, or also by the incorporation of buffering agents in the fermentation medium. Buffering agents such as calcium carbonate or potassium dihydrogen phosphate may be used.

The steroid substrate to be transformed is added to the growing culture of the microorganism as a finely divided solid or in solution in a suitable solvent, such as ethanol, methanol or acetone. The addition of the steroid substrate to the microbial culture should be made under aseptic conditions. The incubation and aeration of the culture is continued in order to bring about the transformation of the steroid substrate. Alternatively, the steroid substrate may be added to the fermentation medium at the time the medium is first inoculated with the culture of microorganism.

The fermentation or biotransformation process is continued until the maximum amount of product has accumulated. This usually occurs within about 24–28 hours, and is most easily determined by periodic analysis of the fermentation system. This analysis can best be carried out chromatographically, as this method gives a quick and accurate representation of the types and relative concentrations of the steroid compounds present. We have used both paper and thin layer chromatography for analysis. The actual methods used, as cited in the examples below, are well-known to persons skilled in the art.

When the steroid transformation has progressed to its optimum stage, the fermentation is terminated and the steroid compounds, both untransformed substrate and the transformation products, are recovered. This is most commonly done by extraction of the aqueous fermentation broth with organic solvents which are immiscible with water. Chloroform, methylene chloride or methyl isobutyl ketone are most satisfactorily used. The whole fermentation broth, including microbial cells and aqueous supernatant fluid, can be extracted or alternatively the cellular mass of the microorganism can first be separated from the aqueous supernatant fluid by centrifugation or filtration. In the latter case, extraction of steroid compounds from the microbial cellular mass is best accomplished by a mixture of solvents, one of which is water-miscible, the other water-immiscible. We have found a 1:1 mixture of methylene chloride:ethanol most satisfactory. By extracting cells and aqueous supernatant broth separately, the formation of troublesome emulsions is often avoided.

The solvent extracts are pooled and residual traces of water are removed with suitable drying agents, such as anhydrous sodium sulfate. The dried solvent extract is then concentrated in vacuo to dryness at temperatures generally not exceeding 60° C. A brownish-colored residue results which contains the steroid compounds of interest as well as many solvent extractable miscellaneous compounds produced as a result of microbial metabolism. It is necessary to remove these contaminating materials in order to obtain the steroid compounds in a purified state.

In certain cases in which the desired steroid product is present in high concentration, purification can be achieved by direct crystallization with solvents. Acetone: hexane mixtures are often used.

However, if a mixture of steroid products results from the fermentation process, or if a significant amount of untransformed steroid substrate remains, more elaborate purification procedures are required. We have used column chromatography most satisfactorily for these purifications. The methods used are known to those skilled in the art, and consist in general of the gradient elution of the steroids from a column of adsorbent material (such as silica or alumina) by mixtures of organic solvents. The presence of the separated steroidal compounds in the solvent fractions obtained after column chromatography is most easily determined by paper or thin layer chromatographic analysis of aliquot samples. The appropriate fractions containing purified steroids are pooled, concentrated in vacuo, and the purified steroids are crystallized from appropriate solvent mixtures.

The following examples illustrate the process of the invention, but are not to be considered as limiting the scope thereof.

Example 1

One ml. of a broth stock culture of Pachybasium Sp. ATCC 16093 is inoculated into 50 ml. of sterile malt extract broth contained in a 250 ml. flask, and incubated 24 hours at 25° C. on a gyrorotary shaker describing a 2-inch circle at 200 r.p.m. This culture is in turn used to inoculate 500 ml. of the same medium in a 2-liter flask and is shaken 24 hours at 25° C. This culture is used for the transformation process.

One gram of B-norprogesterone is dissolved in 10 ml. of ethanol and added to the 24 hour culture above under sterile conditions. The incubation of the culture containing the steroid is continued for an additional 24 to 48 hours.

The reaction is monitored by taking 1 ml. samples during the course of the biotransformation, and extracting these samples with 0.2 ml. of methyl isobutyl ketone (MIBK). 5 microliters of MIBK extract is spotted on Silica Gel G thin layer chromatography plates, which are then developed in ethyl acetate. The dried plates after development are sprayed with 40% sulphuric acid in ethanol to detect the presence and relative concentrations of the steroidal compounds.

The transformation is terminated 24 to 48 hours after addition of the steroid to the culture, and the fungal cells are separated from the supernatant broth by centrifugation. The centrifugate is extracted twice with equal volumes of methylene chloride. The separated fungal cells are extracted with 100 ml. of a mixture of equal volumes of ethanol and methylene chloride. These extracts are combined, dried with anhydrous sodium sulfate and evaporated to dryness.

The dried residue is dissolved in benzene and applied to an alumina (Woelm Grade III) column. To separate the product from the untransformed steroid substrate, the following series of eluting solvents is used: benzene, a benzene-methylene chloride mixture, methylene chloride and finally 1% methanol in methylene chloride. 15 milliliter fractions are collected during the process of elution. 5 to 10 microliters of each fraction is spotted on Silica Gel G thin layer chromatography plates for analysis.

The fractions containing the product, $\Delta^1$-B-nortestololactone, are combined and evaporated to dryness in vacuo. The purified product is crystallized from an acetone:hexane mixture, M.P. 176–180°.

Example 2

The procedure is carried out as described in Example 1, except that Pachybasium Sp. ATCC 16094 is used in place of Pachybasium Sp. ATCC 16093. The product is $\Delta^1$-B-nortestoloacetone, M.P. 176–180°.

Example 3

The product is carried out as described in Example 1, using Pachybasium Sp. ATCC 16095 except that B-nortestosterone is used in place of B-norprogesterone. The product is $\Delta^1$-B-nortestololactone, M.P. 176–180°.

Example 4

The procedure is carried out as described in Example 1, using Pachybasium Sp. ATCC 16114 except that B-norandrost-4-ene-3,17-dione is used in place of B-norprogesterone. The product is $\Delta^1$-B-nortestololactone, M.P. 176–180°.

We claim:
1. A process for the preparation of $\Delta^1$-B-nortestololactone comprising subjecting a member of the group consisting of B-norprogesterone, B-nortestosterone, and B-norandrost-4-ene-3,17-dione to the action of the enzymes of the fungi of the genus Pachybasium in an aqueous medium containing assimilable sources of carbon and nitrogen and recovering the $\Delta^1$-B-nortestololactone produced.

2. A process for the preparation of $\Delta^1$-B-nortestololactone comprising subjecting a member of the group consisting of B-norprogesterone, B-nortestosterone, and B-norandrost-4-ene-3,17-dione to the action of the enzymes of the fungus Pachybasium Sp. ATCC 16093 in an aqueous medium containing assimilable sources of carbon and nitrogen and recovering the $\Delta^1$-B-nortestololactone produced.

3. A process for the preparation of $\Delta^1$-B-nortestololactone comprising subjecting a member of the group consisting of B-norprogesterone, B-nortestosterone, and B-norandrost-4-ene-3,17-dione to the action of the enzymes of the fungus Pachybasium Sp. ATCC 16094 in an aqueous medium containing assimilable sources of carbon and nitrogen and recovering the $\Delta^1$-B-nortestololactone produced.

4. A process for the preparation of $\Delta^1$-B-nortestololactone comprising subjecting a member of the group consisting of B-norprogesterone, B-nortestosterone, and B-norandrost-4-ene-3,17-dione to the action of the enzymes of the fungus Pachybasium Sp. ATCC 16095 in an aqueous medium containing assimilable sources of carbon and nitrogen and recovering the $\Delta^1$-B-nortestololactone produced.

5. A process for the preparation of $\Delta^1$-B-nortestololactone comprising subjecting a member of the group consisting of B-norprogesterone, B-nortestosterone, and B-norandrost-4-ene-3,17-dione to the action of the enzymes of the fungus Pachybasium Sp. ATCC 16114 in an aqueous medium containing assimilable sources of carbon and nitrogen and recovering the $\Delta^1$-B-nortestololactone produced.

6. A process for the preparation of $\Delta^1$-B-nortestololactone comprising subjecting B-norprogesterone to the action of the enzymes of the fungus Pachybasium Sp. ATCC 16093 in an aqueous medium containing assimilable sources of carbon and nitrogen and recovering the $\Delta^1$-B-nortestololactone produced.

References Cited

UNITED STATES PATENTS 2,823,171   2/1958   Fried et al. _____ 195—51
3,287,412  11/1966   Fare et al. _____ 195—51 X ALVIN E. TANENHOLTZ, *Primary Examiner.*